United States Patent Office 3,340,251
Patented Sept. 5, 1967

3,340,251
17β - HYDROXY - 17α - HALOHYDROCARBON - 19-NOR-ANDROST-4-ENE-3-ONES AND THE Δ⁵⁽¹⁰⁾-ISOMERS THEREOF
John Fried, Palo Alto, Calif., and Thomas S. Bry, Linden, and Arthur A. Patchett, Cranford, N.J., assignors to Merck & Co., Inc., Rahway, N.J., a corporation of New Jersey
No Drawing. Filed Oct. 18, 1965, Ser. No. 497,464
19 Claims. (Cl. 260—239.5)

This is a continuation-in-part of Ser. No. 142,776, filed Oct. 4, 1961.

This invention is concerned generally with novel steroid compounds and processes for preparing the same. More particularly, it relates to novel 17β-hydroxy-17α-halohydrocarbon - 19 - nor-androst-4-ene-3-ones and the Δ⁵⁽¹⁰⁾ isomers thereof, and to closely related compounds, in particular the 17β-ethers thereof such as the 17β-alkyl, 17β-cycloalkyl, 17β-aralkyl ethers, 17β-unsaturated hydrocarbon ethers and 17β basically substituted alkyl ethers, and the 17β-acyl esters thereof such as 17β-alkanoyl esters and 17β-alkanoyl esters and 17β-alkyl carbonates.

The compounds prepared by this invention are valuable as orally and parenterally active progestational agents, which also have the property of inhibiting gonadotropin secretion. The compounds are useful in the treatment of various human ailments requiring progestational hormone therapy as well as in the synchronization of the estrus in the domestic animals.

The products of this invention may be represented by the structural formulae:

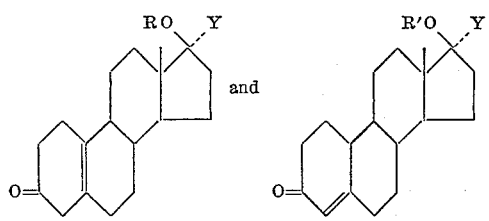

wherein R is hydrogen, aralkanoyl, alkanoyl, aralkyl, alkyl, cycloalkyl, an unsaturated aliphatic radical, and a substituted amino alkyl radical, Y is an unsaturated halohydrocarbon radical having 2 to 3 carbon atoms.

In preparing our novel chemical compounds, the starting material utilized is the 3-methoxy-19-nor-2,5(10)-androstadiene-17-one, which has the following structural formula:

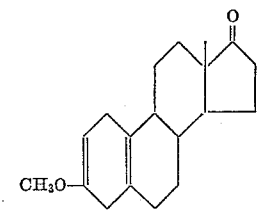

It has been found that the above starting material will react with a halogenated, unsaturated hydrocarbon magnesium halide, such as the magnesium bromide which contains 2 to 3 carbon atoms such as trifluorovinyl magnesium bromide, trifluoromethylvinyl magnesium bromide, trifluoromethylethynyl magnesium bromide, and the like to form the corresponding 17α-substituted-17β-hydroxy steroid, for example the 17α-trifluorovinyl-3-meth-oxy-19-nor-2,5(10)-androstadiene which has the following structural formula:

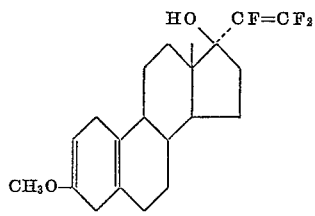

The 17α-substituted 3-methoxy-19-nor-2,5(10-androstadiene-17β-ol is converted into the corresponding 17α-substituted 17β-hydroxy-19-nor-4-androstene-3-one which has the following formula:

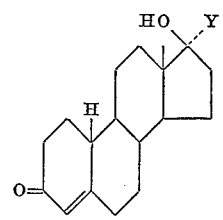

wherein Y is selected from the group consisting of trifluorovinyl, trifluoromethylvinyl and trifluoromethylethynyl by reaction with a strong mineral acid, such as p-toluenesulfonic acid. For example, a mixture of the steroid and p-toluenesulfonic acid in acetone solution is left standing at room temperature for about 18 hours.

The 17α-substituted 17β-hydroxy-19-nor-4-androstene-3-one and the 17α-substituted 17β-hydroxy-19-nor-5(10)-androstene-3-one are converted into the 17β-alkanoyl ester by reaction with an alkanoic acid anhydride or alkanoyl halide in the presence of a tertiary amine such as pyridine. The acid anhydrides which may be used for this purpose include acetic anhydride, propionic anhydride, butyric anhydride and the like. The 17β-caproate is prepared by the reaction of the 17β-free alcohol with caproyl halide in the presence of a tertiary amine base.

The 17β-substituted 3-methoxy-19-nor-2,5(10)-androstadiene-17β-ol is converted into the 17α-substituted 17β-hydroxy-19-nor-5(10)-androstene-3-one which has the following formula:

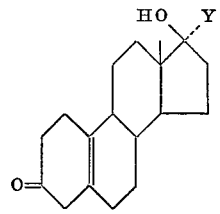

wherein Y is as above by reaction with a weak organic acid such as acetic acid. For example, a mixture of the steroid and glacial acetic acid and sodium acetate in an aqueous solution of absolute ethanol and tetrahydrofuran is left standing at room temperature for several hours.

Useful and novel compounds within the scope of the present invention which may be prepared by this process include 17α-trifluorovinyl-17β-hydroxy-19-nor-4-androstene-3-one-17β-acetate,
17α-trifluoromethylvinyl-17β-hydroxy-19-nor-4-androstene-3-one-17β-propionate,
17α-trifluoromethylethynyl-17β-hydroxy-19-nor-4-androstene-3-one-17β-butyrate,
18α-trifluorovinyl-17β-hydroxy-19-nor-5(10)-androstene-3-one-17β-hexanoate, 17α-trifluoromethylvinyl-17β-hydroxy-19-nor-5(10)-androstene-3-one-17β-caproate and
17α-trifluoromethylethylnyl-17β-hydroxy-19-nor-5(10)-androstene-3-one-17β-valerate.

The 17α-halo hydrocarbon-17β-hydroxy-19-nor-androstene-3-ones of this invention are readily converted into the corresponding 17β-aralkyl, 17β-alkyl, 17β-unsaturated aliphatic ethers and 17β-substituted amino alkyl ethers by reaction when an aralkyl, an alkyl, a cycloalkyl, or unsaturated aliphatic or a substituted amino alkyl halide or sulfate and a base.

In one modification of this process the 17β-hydroxy compound is reacted with an halide and silver oxide in a solvent such as a dialkyl alkanolylamide such as dimethyl formamide and the like to form the corresponding 17β-ether. The alkyl halides which may be used for this purpose include methyl iodide, ethyl iodide, propyl iodide, isopropyl iodide, butyl iodide, isobutyl iodide, amyl iodide, isoamyl iodide, hexyl iodide and the corresponding alkyl bromides. Also suitable are the cycloalkyl halides such as cyclopentyl iodide, cyclohexyl iodide, cyclopentyl bromide and cyclohexyl bromide and aralkyl halides, suitably benzyl iodide. The unsaturated aliphatic halides such as allyl bromide and cyclohexenyl iodide as well as the substituted amino alkyl halides such as diethyl amino ethyl bromide, pyrrolidyl ethyl bromide and morpholino propyl bromide may also be used.

The steroid alcohol, for example 17α-trifluoromethylvinyl-17β-hydroxy-19-nor-4-androstene-3-one is mixed with the solvent, for example dimethyl formamide in the presence of the alkyl halide such as ethyl iodide, and silver oxide is added. The mixture is stirred at from about 10° to about 80° C. for from 2 to 6 days, from 15° to 30° C. for 4 days being preferred, a small amount of silver oxide being added each day. The product is then isolated. In one mode of isolation a reaction inert, water immiscible solvent, for example a halogenated hydrocarbon solvent suitably chloroform is added to the reaction mixture which is then stirred and filtered. The solvent is removed from the filtrate preferably by evaporation under reduced pressure and the residue chromatographed.

In an alternative method of preparation, the 17β-hydroxy steroid may be taken up in a reaction inert organic solvent, such as an aromatic hydrocarbon solvent, for example, benzene or toluene, and treated with an aliphatic halide, any of the aralkyl, alkyl, cycloalkyl, unsaturated aliphatic and substituted amino alkyl listed in the above-mentioned modification of the process being suitable, in the presence of an alkali metal hydride such as sodium or potassium hydride to produce the 17β-ether.

The steroid alcohol, for example 17α-trifluoromethylethynyl-17β-hydroxy-19-nor-4-androstene - 3 - one is dissolved in a reaction inert organic solvent, for example, benzene, and the aliphatic halide, for example cyclopentyl iodide in benzene is added. A small excess of halide is used. The alkali metal hydride, suitably sodium hydride is then suspended in the same solvent and added to the mixture. The mixture is then agitated for from about 1 to about 36 hours at a temperature of from about 10° to 80° C., agitation for 18 hours at from 15°–30° C. being preferred. The product is then isolated. In one suitable method of isolation, water is added to the mixture to destroy any remaining alkali metal hydride and the mixture extracted with a reaction inert water immiscible solvent such as benzene or ether. The organic extract is dried over a suitable drying agent, such as potassium carbonate and filtered. The solvent is then removed, suitably by evaporation under reduced pressure to yield the desired product as a residue which may be further purified by chromatography.

In yet another modification of the process, the 17β-hydroxy steroid is reacted with an aryl or alkyl alkali metal salt such as methyl lithium, butyl lithium or phenyl lithium to produce a corresponding 17β-oxy lithium salt which is then treated with an aralkyl, alkyl or cycloalkyl halide. Any of the halides utilized in the previous modification of this process being suitable to produce the desired 17β-aralkoxy, 17β-alkoxy or 17β-cycloalkloxy steroid.

The steroid alcohol, for example 17α-trifluoromethylvinyl-17β-hydroxy-19-nor-5(10)-androstene-3-one is taken up in an ether, diethyl ether, or tetrahydrofuran being preferred. A solution of an aryl or alkyl alklai metal salt suitably phenyl lithium or butyl lithium in ether or tetrahydrofuran is then added. The mixture is then agitated for from about 1 to about 4 hours at from about 10° to about 30° C., in an inert atmosphere, a nitrogen atmosphere being preferred. A solution of the aralkyl, alkyl or cycloalkyl halide in a similar solvent, for example ether or tetrahydrofuran is then added and the mixture agitated at from about 10° to about 60° C. for a further period of from about 10 to about 24 hours, agitation at about 15° to about 30° C. for about 18 hours being especially suitable. The product is then isolated, suitably a saturated brine solution is added and the mixture extracted with a water immiscible solvent such as benzene or ether. The organic extract is then dried over a suitable drying agent such as sodium sulfate, filtered and the solvent removed, preferably by evaporation under reduced pressure. The residue containing the desired product may be further purified by chromatography.

In another modification of the process the 17β-hydroxy steroid, for example 17α-trifluorovinyl-17β-hydroxy-19-nor-5(10)-androstene-3-one is treated with a dihydrocarbon sulfate in an aqueous alkaline medium to produce the corresponding steroid 17β ethers. The dialkyl, diaralkyl and dicycloalkyl sulfates which may be used in this modification include, for example dimethyl sulfate, diethyl sulfate, dipropyl sulfate, diisopropyl sulfate, dibutyl sulfate, diisobutyl sulfate, diamyl sulfate, diisoamyl sulfate, dihexyl sulfate, dibenzyl sulfate, dicyclopentyl sulfate, dicyclohexyl sulfate, and the like. Sodium or potassium hydroxide in aqueous solution are preferred as the alkaline medium.

The steroid alcohol for example, 17α-trifluoromethylethynyl-17β-hydroxy-19-nor-5(10) - androstene-3-one is taken up in a reaction inert solvent such as benzene, toluene, ether or tetrahydrofuran and added to a mixture of the dialkyl sulfate in the aqueous alkaline medium. It is preferred to use a small excess of the dialkyl sulfate, a molar excess of about 5% to about 20% being suitable. The mixture is then allowed to stand for from 1 to 24 hours at a temperature of from about 10° to about 80° C., however it is preferred to allow the mixture to stand for about 18 hours at about 15° to about 30° C. Where the solvent utilized is substantially immiscible with the aqueous medium it is preferred to agitate the mixture during the reaction time. The product is then isolated. In one method of isolation the mixture is extracted with a reaction inert water immiscible solvent such as benzene or toluene. The extract is then dried over a drying agent for example over potassium carbonate, filtered and the solvent removed, suitably by evaporation under reduced pressure. The product is obtained as a residue which may be further purified by chromatography.

Useful and novel products within the scope of the present invention which may be prepared by these processes include 17α - trifluorovinyl - 19 - nor - 4 - androstene - 3 - one 17β - methyl ether, 17α - trifluoromethylvinyl - 19 - nor - 4 - androstene - 3 - one - 17β-ethyl ether, 17α - trifluoromethylethynyl-19-nor-4-androstene- 3-one-17β-propyl ether, 17α-trifluorovinyl-19-nor-5 (10)-androstene-3-one-17β-butyl ether, 17α-trifluoromethylvinyl-19-nor-5(10)-androstene-3-one-17β-isobutyl ether, 17α - trifluoromethylethynyl-19-nor-5(10) - androstene-3-one-17β-amyl ether, 17α - trifluorovinyl-19-nor-4-androstene-3-one-17β-hexyl ether, 17α-trifluoromethylvinyl-19-nor-4-androstene-3-one-17β-cyclopentyl ether, 17α-trifluoromethylethynyl-19-nor-4 - androstene - 3-one-17β-cyclohexyl ether, 17α-trifluoromethylvinyl-19-nor-4-androstene- 3-one-17β-benzyl ether and 17α-trifluoromethylethynyl-19-nor-5(10)-androstene-3-one 17β-benzyl ether, 17α-trifluorovinyl-19-nor-4-androstene-3-one-17β - allyl ether, 17α-trifluoromethylvinyl-19-nor-5(10) - androstene-3-one17β-cyclohexenyl ether, 17α-trifluoromethylethynyl-19-nor-4-androstene-3-one-17β-diethylamino ethyl ether, 17α-trifluoromethylvinyl-19-nor-5(10) - androstene - 3-one-17β-pyrrolidyl ethyl ether and 17α-trifluoromethylethynyl-19-nor-4-androstene-3-one-17β-morpholino propyl ether.

The compounds of this invention may be administered alone or associated with a pharmaceutical carrier, choice of which depends upon the properties of the active compound and standard pharmaceutical practice. Generally the compound is administered in dosages of the same order of magnitude as other progestational agents such as Norethisterone and dosage units may take the form of tablets, powders, capsules, elixirs, or syrups which are particularly useful for oral ingestion. Liquid diluents are employed as a condition for parenteral use.

The following examples are given by way of illustration only and are not intended as a limitation of this invention, many apparent variations of which are possible without departing from the invention and scope thereof.

EXAMPLE 1

500 cc. three-neck round bottom flask is fitted with a Dry Ice condenser, a dropping funnel and a magnetic stirrer. After the addition of 4.0 g. of magnesium, the entire system is swept with nitrogen and flame dried. One hundred cc. of dry tetrahydrofuran is added to the magnesium and 13 g. of trifluorovinyl bromide is bubbled into the solution held at 25° C. with stirring. The solution is decanted into a dry flask and stored. A solution of 500 mg. of 3-methoxy-2,5(10)-androstadiene-17-one which is dried by azeotropic distillation from benzene, is added in 5 cc. of benzene and 5 cc. of dry ether to 50 cc. of the triflorovinyl magnesium bromide solution prepared above. The reaction is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of petroleum ether and ether to give 17α-trifluorovinyl-3-methoxy-2,5(10)-androstadiene-17β-ol.

In accordance with the above procedure but starting with trifluoromethylvinyl bromide and trifluoromethylethynyl bromide in place of trifluorovinyl bromide there is obtained 17α - trifluoromethylvinyl - 3-methoxy-19-nor-2,5(10)-androstadiene-17β-ol and 17α - trifluoromethylethynyl-3-methoxy-19-nor-2,5(10) -androstadiene-17β-ol.

EXAMPLE 2

To 150 mg. of the product obtained in Example 1, in 15 cc. of acetone is added 15 mg. of paratoluenesulfonic acid. This mixture is allowed to stand for 18 hours at room temperature, and is then poured into ice water and extracted with ether. The organic extracts are washed to neutrality with water, dried over sodium sulfate and concentrated in vacuo. The residue is chromatographed on 5 g. of acid-washed alumina by charging with benzene and eluting with 6 parts of a mixture of petroleum ether with 4 parts of ether. Recrystallization from a mixture of petroleum ether and ether affords 17α-trifluorovinyl-17β-hydroxy-19-nor-4-androstene-3-one.

In accordance with the above procedure but starting with 17α-trifluoromethylvinyl-3-methoxy-19-nor-2,5(10)-androstadiene-17β-ol and 17α - trifluoromethylethynyl-3-methoxy-19-nor-2,5(10)-androstadiene-17β-ol in place of 17α-trifluorovinyl-3-methoxy - 19-nor-2,5(10)-androstadiene-17β-ol there is obtained 17α-trifluoromethylvinyl-17β-hydroxy-19-nor-4 - androstene-3-one, and 17α-trifluoromethylethynyl-17β-hydroxy-19-nor-androstene-3-one.

EXAMPLE 3

To 410 mg. of 17α-trifluorovinyl-3-methoxy-19-nor-2,5(10)-androstadiene-17β-ol in 4.1 cc. of tetrahydrofuran and 18.45 cc. of absolute ethanol is added 8.2 cc. of glacial acetic acid and 0.5 g. of sodium acetate in 4.1 cc. of water. This reaction mixture is left stirring at room temperature for 5 hours. It is then poured into an ice-sodium bicarbonate solution and extracted with benzene. The benzene extract is washed with water until the washings are just slightly basic, dried over sodium sulfate and concentrated in vacuo. The crude product is chromatographed on 40 g. of silica gel by charging with a mixture of 1 part benzene and 1 part petroleum ether, and eluting with mixtures of petroleum ether and ether to yield 17α-trifluorovinyl-17β-hydroxy-19-nor-5(10)-androstene-3-one.

In accordance with the above procedure but starting with 17α-trifluoromethylvinyl-19-nor-3-methoxy-2,5(10)-androstadiene-17β-ol and 17α-trifluoromethylethynyl-3-methoxy-19-nor-2,5(10)-androstadiene-17β-ol in place of 17α - trifluorovinyl - 3 - methoxy-19-nor-2,5(10)-androstadiene-17β-ol there is obtained 17α-trifluoromethylvinyl-17β-hydroxy-19-nor-5(10)-androstene-3-one and 17α-trifluoromethylethynyl - 17β - hydroxy-19-nor-5(10)-androstene-3-one.

EXAMPLE 4

One hundred mg. of 17α-trifluorovinyl-17β-hydroxy-19-nor-4-androstene-3-one is heated with 1 cc. of acetic anhydride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether and petroleum ether to give 17β-acetoxy-17α-trifluorovinyl-19-nor-4-androstene-3-one.

In accordance with the above procedure but starting with 17α-trifluoromethylvinyl-17β-hydroxy - 19 - nor - 4-androstene-3-one, 17α-trifluoromethylethynyl - 17β - hydroxy-19-nor-4-androstene-3-one, 17α-trifluorovinyl-17β-hydroxy-19-nor-5(10)-androstene - 3 - one, 17α-trifluoromethylvinyl - 17β - hydroxy-19-nor-5(10)-androstene-3-one, and 17α-trifluoromethylethynyl-17β-hydroxy-19-nor-5(10)-androstene-3-one in place of 17α-trifluorovinyl-17β-hydroxy-19-nor-4-androstene-3-one there is obtained 17β-acetoxy - 17α - trifluoromethylvinyl-19-nor-4-androstene-3-one, 17β-acetoxy-17α-trifluoromethylethynyl - 19-nor-4-androstene-3-one, 17β - acetoxy-17α-trifluorovinyl-19-nor-5(10)-androstene-3-one, 17β-acetoxy - 17α - trifluoromethylvinyl-19-nor-5(10)-androstene-3-one and 17β-acetoxy-17α-trifluoromethylethynyl - 19 - nor - 5(10)-androstene-3-one.

In accordance with the above procedure but starting with any of the aforementioned 17β-hydroxy androstenes and using propionic anhydride, butyric anhydride and valeric anhydride in place of acetic anhydride there are obtained the corresponding 17β-propionoxy, 17β-butyroxy, and 17β-valeroxy androstenes.

EXAMPLE 5

One hundred mg. of 17α-trifluorovinyl-17β-hydroxy-19-nor-4-androstene-3-one is heated with 1 cc. of caproyl chloride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether and petroleum ether to give 17β-caproyloxy-17α-trifluorovinyl-19-nor-4-androstene-3-one.

In accordance with the above procedure but starting with 17α-trifluoromethylvinyl - 17β - hydroxy-19-nor-4-androstene-3-one, 17α - trifluoromethylethynyl-17β-hydroxy-19-nor-4-androstene-3-one, 17α-trifluorovinyl-17β-hydroxy-19-nor-5(10)-androstene-3-one, 17α - trifluoromethylvinyl - 17β - hydroxy-19-nor-5(10)-androstene-3-one, and 17α-trifluoromethylethynyl-17β-hydroxy-19-nor- 5(10)-androstene-3-one in place of 17α-trifluorovinyl-17β-hydroxy-19-nor-4-androstene-3-one there is obtained 17β-caproyloxy - 17α-trifluoromethylvinyl-19-nor-4-androstene-3-one, 17β-caproyloxy-17α-trifluoromethylethynyl-19-nor-4-androstene-3-one, 17β-caproyloxy-17α-trifluorovinyl-19-nor-5(10)-androstene-3-one, 17β-caproyloxy-17α-trifluoromethylvinyl-19-nor-5(10)-androstene - 3 - one and 17β-caproyloxy-17α-trifluoromethylethynyl - 19 - nor - 5(10) - androstene-3-one.

In accordance with the above procedure but starting with any of the aforementioned 17β-hydroxy androstenes and using benzoyl chloride, propionyl chloride, butyryl chloride, t-butylacetyl chloride and valeryl chloride in place of caproyl chloride there are obtained the corresponding 17β-benzoxy, 17β-propionoxy, 17β-butyroxy, 17β-t-butyl acetoxy, and 17β-valeroxy androstenes.

EXAMPLE 6

A mixture of 500 mg. of 17α-trifluorovinyl-17β-hydroxy-19-nor-4-androstene-3-one, 10 ml. of dimethyl formamide, 20 ml. of ethyl iodide, and 1.5 grams of silver oxide are stirred at room temperature for 4 days, an additional ½ gram of silver oxide being added at the end of each day. 100 ml. of chloroform is then added to the reaction mixture and the mixture is stirred for one hour and filtered. The filtrate is evaporated to dryness and the residual oil is chromatographed over acid washed alumina and eluted with mixtures of ether and petroleum ether to give 17α - trifluorovinyl-19-nor-4-androstene-3-one-17β-methyl ether.

In accordance with the above procedure but starting with 17α - trifluoromethylvinyl-17β-hydroxy-19-nor-4-androstene-3-one, 17α-trifluoromethylethynyl-17β-hydroxy-19-nor-4-androstene-3-one, 17α-trifluorovinyl - 17β - hydroxy-19-nor-5(10)-androstene-3-one, 17α-trifluoromethylvinyl-17β-hydroxy-19-nor-5(10)-androstene-3-one and 17α-trifluoromethylethynyl - 17β - hydroxy-19-nor-5(10)-androstene-3-one in place of 17α-trifluorovinyl-17β-hydroxy-19-nor-4-androstene-3-one there is obtained 17α-trifluoromethylvinyl-19-nor-4-androstene - 3 - one - 17β-methyl ether, 17α-trifluoromethylethynyl-19-nor-4-androstene-3-one-17β-methyl ether, 17α-trifluorovinyl-19-nor-5(10)-androstene-3-one-17β-methyl ether, 17α-trifluoromethylvinyl-19-nor-5(10)-androstene-3-one - 17β - methyl ether, and 17α - trifluoromethylethynyl-19-nor-5(10)-androstene-3-one-17β-methyl ether.

In accordance with the above procedure but starting with any of the aforementioned 17β-hydroxy androstenes and using propyl, butyl, amyl, hexyl, cyclopentyl, cyclohexyl, allyl, cyclohexenyl, diethylamino ethyl, pyrrolidyl ethyl, morpholino ethyl, or benzyl iodide or bromide in place of methyl iodide there are obtained the corresponding 17β-ethoxy, 17β-propoxy, 17β-butoxy, 17β-amoxy, 17β-hexoxy, 17β-cyclopentyloxy, 17β-allyloxy, 17β-cyclohexenoxy, 17β-diethylamino ethoxy, 17β-pyrrolidyl ethoxy, 17β-morpholino ethoxy, and 17β-benzyloxy androstenes.

EXAMPLE 7

To a mixture of 710 milligrams of 17α-trifluoromethylvinyl-17β-hydroxy-19-nor-4-androstene-3-one and 20 ml. of cyclopentyl iodide in 100 milliliters of benzene are added a suspension of 5 gms. of sodium hydride in 20 milliliters of benzene and the mixture stirred at about 20° C. for 2 days under a nitrogen atmosphere. 100 milliliters of water are then added to the mixture which is then stirred for a further hour. The organic layer is separated and the water layer extracted with benzene. The combined benzene extracts are then dried over anhydrous potassium carbonate, filtered, and evaporated under reduced pressure. The residue is then chromatographed over acid washed alumina and eluted with mixtures of ether and petroluem ether to give 17α-trifluoromethylvinyl-19-nor-4-androstene-3-one-17β-cyclopentyl ether.

In accordance with the above procedure but starting with 17α-trifluorovinyl-17β-hydroxy-19-nor-4-androstene-3-one, 17α - trifluoromethylethynyl - 17β - hydroxy - 19-nor-4-androstene-3-one, 17α-trifluorovinyl-17β-hydroxy-19-nor-5(10)-androstene-3-one, 17α-trifluoromethylvinyl-17β-hydroxy-19-nor-5(10)-androstene-3-one and 17α-trifluoromethylethynyl - 17β - hydroxy - 19 - nor - 5(10)-androstene-3-one in place of 17α-trifluoromethylvinyl-17β-hydroxy-19-nor-4-androstene-3-one there is obtained 17α - trifluorovinyl - 19 - nor - 4 - androstene - 3 - one-17β-cyclopentyl ether, 17α-trifluoromethylethynyl-19-nor-4-androstene-3-one-17β-cyclopentyl ether, 17α-trifluorovinyl - 19 - nor - 5(10) - androstene - 3 - one - 17β - cyclopentyl ether, 17α-trifluoromethylvinyl-19-nor-5(10)-androstene-3-one-17β-cyclopentyl ether and 17α-trifluoromethylethynyl - 19 - nor - 5(10) - androstene - 3 - one-17β-cyclopentyl ether.

In accordance with the above procedure but starting with any of the aforementioned 17β-hydroxy androstenes and using methyl, ethyl, propyl, butyl, amyl, hexyl, benzyl and cyclohexyl iodide or bromide in place of cyclopentyl iodide there are obtained the corresponding 17β-methoxy, 17β-ethoxy, 17β-propoxy, 17β-butoxy, 17β-amoxy, 17β-hexoxy, 17β-benzyloxy and 17β-cyclohexoxy androstenes.

EXAMPLE 8

To a solution of 744 mg. of 17α-trifluoromethylethynyl-17β-hydroxy-19-nor-4-androstene-3-one in 30 ml. of tetrahydrofuran is added a solution containing 2 gms. of phenyl lithium. The mixture is then stirred for 2 hours at 20° C. under nitrogen. A solution of 5 gms. of n-butyl iodide in 10 ml. of tetrahydrofuran is then added and the mixture stirred under nitrogen at 20° C. for a further 18 hours. The reaction mixture is then decomposed by the addition of a saturated aqueous solution of sodium chloride. The mixture is then thoroughly extracted with benzene and the organic extract dried over sodium sulfate, filtered, and evaporated under reduced pressure. The residue is then chromatographed over acid washed alumina and eluted with a mixture of ether and petroleum ether to give 17α-trifluoromethylethynyl-19-nor-4-androstene-3-one-17β-n-butyl ether.

In accordance with the above procedure but starting with 17α - trifluoromethylvinyl - 17β - hydroxy - 19 - nor-4 - androstene - 3 - one, 17α - trifluorovinyl - 17β - hydroxy-19-nor-4-androstene-3-one, 17α-trifluorovinyl-17β-hydroxy - 19 - nor - 5(10) - androstene - 3 - one, 17α-trifluoromethylvinyl - 17β - hydroxy - 19 - nor - 5(10)-androstene-3-one and 17α-trifluoromethylethynyl-17β-hydroxy-19-nor-5(10)-androstene-3-one in place of 17α-trifluoromethylethynyl - 17β - hydroxy - 19 - nor - 4 - androstene-3-one there is obtained 17α-trifluoromethylvinyl-19-nor-4-androstene-3-one-17β-n-butyl ether, 17α-trifluorovinyl-19-nor-4-androstene-3-one-17β-n-butyl ether, 17α-trifluorovinyl - 19 - nor - 5(10) - androstene - 3 - one-17β-n-butyl ether, 17α-trifluoromethylvinyl-19-nor-5(10)-androstene-3-one-17β-n-butyl ether and 17α-trifluoromethylethynyl-19-nor-5(10)-androstene-3-one-17β-n-butyl ether.

In accordance with the above procedure but starting with any of the aforementioned 17β-hydroxy androstenes and using methyl, ethyl, propyl, amyl, hexyl, cyclopentyl, cyclohexyl and benzyl iodide or bromide in place of n-butyl iodide there are obtained the corresponding 17β-methoxy, 17β-ethoxy, 17β-propoxy, 17β-amoxy, 17β-hexoxy, 17β-cyclopentyloxy, 17β-cyclohexoxy and 17β-benzyloxy androstenes.

EXAMPLE 9

To a mixture of 1 gm. of dimethyl sulfate in 10 ml. of N-sodium hydroxide is added a solution of 734 mg. of 17α - trifluorovinyl - 17β - hydroxy - 19 - nor - 4 - androstene-3-one in 50 ml. of benzene. The mixture is then vigorously agitated for 18 hours at 20° C. At the end of this time the mixture may have formed an emulsion which is then reconstituted into its constituent parts by the addition of a small amount of ethanol and solid sodium chloride. The organic layer is then separated and the aqueous layer thoroughly extracted with benzene. The organic extract is then dried over potassium carbonate, filtered and the solvent removed by evaporation under reduced pressure. The residue is then chromatographed over acid washed alumina and eluted with a mixture of ether and petroleum ether to give 17α-trifluorovinyl-19-nor-4-androstene-3-one-17β-methyl ether.

In accordance with the above procedure but starting with 17α - trifluoromethylvinyl - 17β - hydroxy - 19 - nor - 4 - androstene - 3 - one, 17α - trifluoromethylethynyl-17β - hydroxy - 19 - nor - 4 - androstene - 3 - one, 17α-trifluorovinyl - 17β - hydroxy - 19 - nor - 5(10) - androstene-3-one, 17α-trifluoromethylvinyl-17β-hydroxy-19-nor-5(10)-androstene-3-one and 17α-trifluoromethylethynyl-17β-hydroxy-19-nor-5(10)-androstene-3-one in place of 17α - trifluorovinyl - 17β - hydroxy - 19 - nor - 4 - androstene-3-one there is obtained 17α-trifluoromethylvinyl-19-nor-4-androstene-3-one-17β-methyl ether, 17α-trifluoromethylethynyl - 19 - nor - 4 - androstene - 3 - one - 17β-methyl ether, 17α-trifluorovinyl-19-nor-5(10)-androstene-3-one-17β-methyl ether, 17α-trifluoromethylvinyl-19-nor-5(10)-androstene-3-one-17β-methyl ether and 17α-trifluoromethylethynyl - 19 - nor - 5(10) - androstene - 3 - one-17β-methyl ether.

In accordance with the above procedure but starting with any of the aforementioned 17β-hydroxyandrostenes and using diethyl, dipropyl, dibutyl, diamyl, dihexyl, dicyclopentyl, dicyclohexyl and dibenzyl sulfate in place of dimethyl sulfate there are obtained the corresponding 17β-ethoxy, 17β-propoxy, 17β-butoxy, 17β-amoxy, 17β-hexoxy, 17β-cyclopentyloxy, 17β-cyclohexoxy, and 17β-benzyloxy androstenes.

We claim:
1. 17α-substituted-17β-hydroxy-19-nor-5(10) - androstene-3-one wherein the 17α-substituent is an unsaturated fluorohydrocarbon radical having 2 to 3 carbon atoms.
2. 17α - substituted-17β-alkanoyloxy-19-nor-5(10)-androstene-3-one wherein the substituent at 17α is an unsaturated fluorohydrocarbon radical having from 2 to 3 carbon atoms.
3. 17α-substituted - 17β - cycloalkoxy-19-nor-5(10)-androstene-3-one wherein the substituent at 17α is an unsaturated fluorohydrocarbon radical having from 2 to 3 carbon atoms.
4. 17α-substituted - 17β - alkoxy-19-nor-5(10)-androstene-3-one wherein the substituent at 17α is an unsaturated fluorohydrocarbon radical having from 2 to 3 carbon atoms.
5. 17α-substituted - 19 - nor-5(10)-androstene-3-one-17β - unsaturated hydrocarbon ether wherein the substituent at 17α is an unsaturated fluorohydrocarbon radical having from 2 to 3 carbon atoms.
6. 17α-substituted - 19 - nor-5(10)-androstene-3-one-17β basic alkyl ether wherein the substituent at 17α is an unsaturated fluorohydrocarbon radical having from 2 to 3 carbon atoms.
7. 17α-trifluorovinyl - 17β - acetoxy-19-nor-5(10)-androstene-3-one.
8. 17α-trifluorovinyl - 17β - hydroxy-19-nor-5(10)-androstene-3-one.
9. 17α-trifluoromethylethynyl - 17β - hydroxy-19-nor-5(10)-androstene-3-one.
10. 17α-trifluoromethylethynyl - 17β - caproyloxy-19-nor-5(10)-androstene-3-one.
11. 17α-trifluoromethylethynyl - 17β - acetoxy-19-nor-4-androstene-3-one.
12. 17α-trifluoromethylethynyl - 17β - caproyloxy-19-nor-4-androstene-3-one.
13. 17α-trifluorovinyl - 17β - methoxy-19-nor-5(10)-androstene-3-one.
14. 17α-trifluoromethylethynyl - 17β - cyclopentoxy-19-nor-5(10)-androstene-3-one.
15. 17α-trifluoromethylethynyl - 19 - nor-5(10)-androstene-3-one-17β-pyrrolidyl ethyl ether.
16. 17α-trifluorovinyl - 19 - nor-5(10)-androstene-3-one-17β-diethylaminoethyl ether.
17. 17α-trifluoromethylethynyl - 17β - methoxy-19-nor-4-androstene-3-one.
18. 17α-trifluoromethylvinyl - 19 - nor-4-androstene-3-one-17β-allyl ether.
19. 17α-trifluoromethylethynyl - 19 - nor-4-androstene-3-one-17β-diethylaminoethyl ether.

References Cited

UNITED STATES PATENTS 3,178,456    4/1965    Wettstein et al. ____ 260—397.3

OTHER REFERENCES

Fried et al., "Journal of the American Chemical Soc.," vol. 83, November 1961, pages 4663–4664 relied on.

LEWIS GOTTS, *Primary Examiner.*

ELBERT L. ROBERTS, *Assistant Examiner.*